Patented Nov. 4, 1947

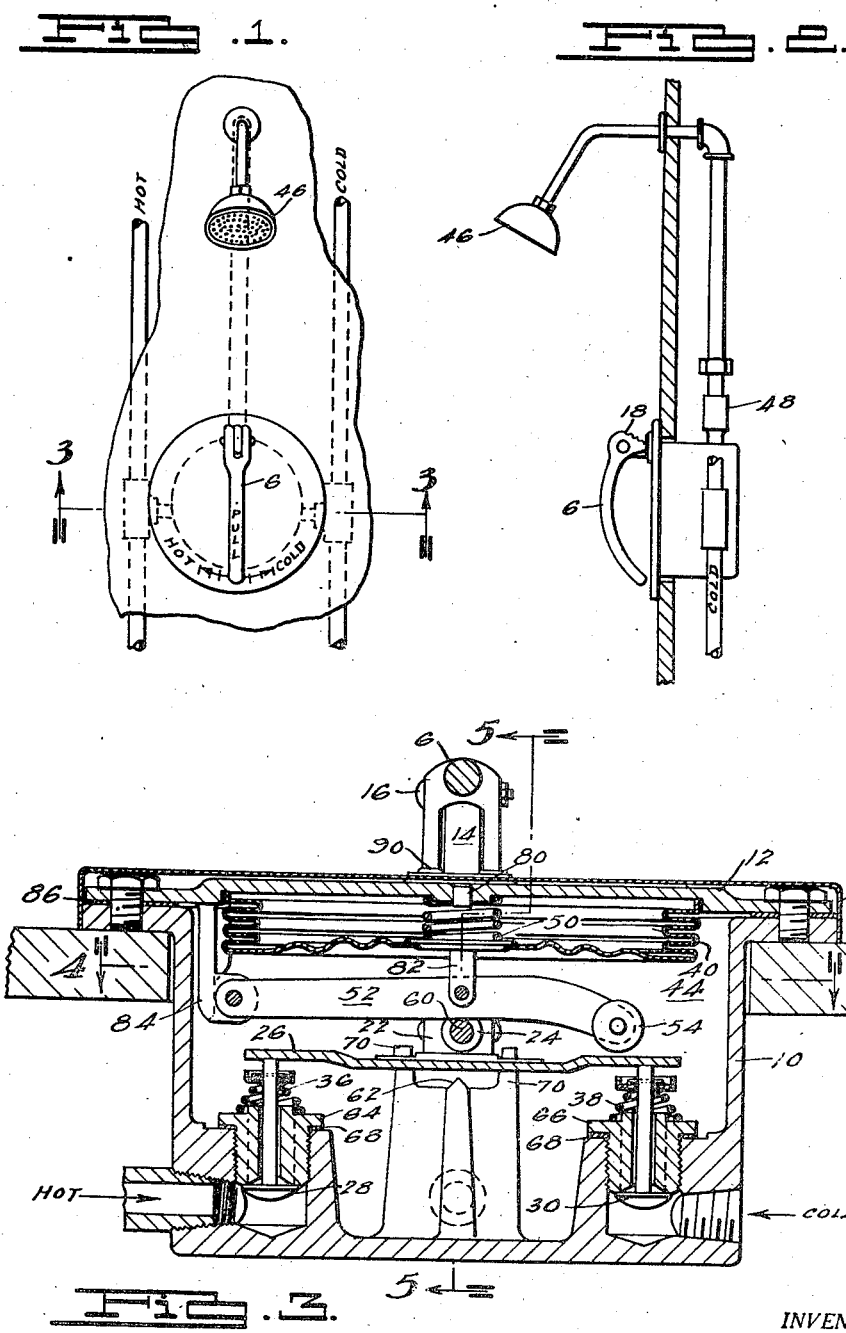

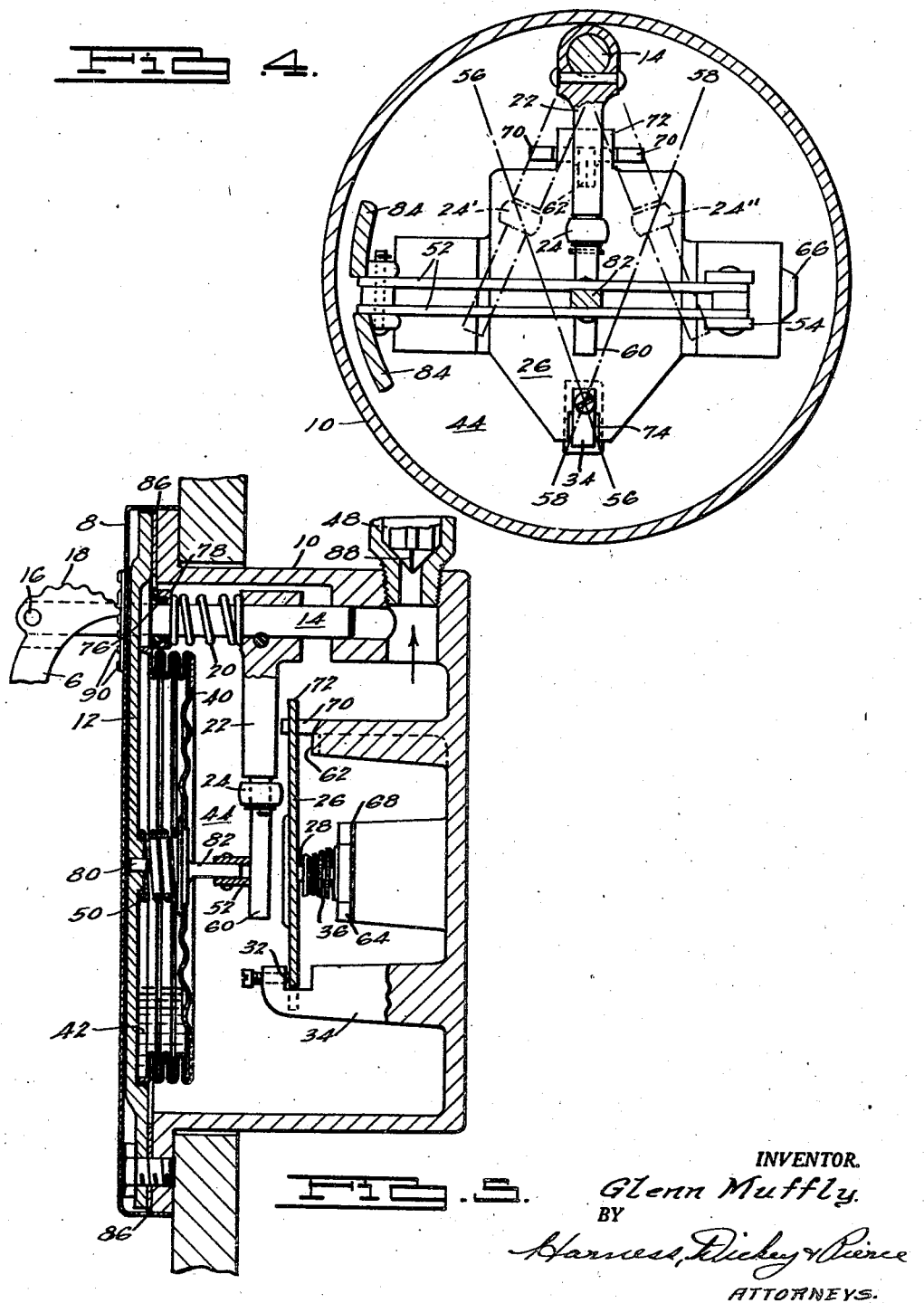

2,430,133

UNITED STATES PATENT OFFICE 2,430,133

THERMALLY CONTROLLED MIXING VALVE

Glenn Muffly, Springfield, Ohio

Application October 15, 1943, Serial No. 506,395

13 Claims. (Cl. 236—12)

This invention pertains to thermally controlled mixing valves, particularly for mixing hot and cold liquids. Such valves are used to control the water temperature for shower baths, lavatories, washing machines, dual faucets for sinks, laundry tubs, etc.

Some of the objects of this invention are:

To provide an automatic valve which responds more quickly to temperature and pressure changes in the hot and cold supply lines, so as to minimize temperature variations at the outlet.

To provide more convenient means for independently adjusting the temperature and the rate of flow.

To insure against personal injury by scalding, in the event of failure of the temperature regulating means.

To provide manual control means which will be readily understood by inexperienced users and is of such a nature that no one can cause injury to himself, to others, or to property, by error in manipulation.

To provide close control of temperature so as to hold the supply of mixed hot and cold liquids within a narrow temperature range.

To provide for opening the two valves simultaneously, so as to avoid the need for going through an all-hot or all-cold position of adjustment when turning the water on.

To maintain substantially constant pressure in the chamber which encloses the temperature-responsive element, so that pressure variations will not interfere with temperature regulation.

To provide for use of the vapor-pressure type of thermally responsive element without the faults common to previous uses of this class of element.

To employ a fluid of low vapor pressure in the expansible chamber so that any failure of the flexible wall will result in opening the cold instead of the hot valve and thus avoid injury to users.

To provide a readily installed and easily serviceable valve assembly with access from the front or exposed side.

To simplify construction, reduce costs and otherwise improve the device, as set forth in the following description.

In the drawings, wherein similar reference numbers refer to similar parts throughout:

Fig. 1 is a front elevation of the valve mechanism installed.

Fig. 2 is a side elevation of Fig. 1.

Fig. 3 is an enlarged horizontal sectional view of the working parts of the valve mechanism, taken on the line 3—3 of Fig. 2.

Fig. 4 is a fractional front sectional view on the line 4—4 of Fig. 3, showing interior parts of the valve mechanism.

Fig. 5 is a fractional vertical sectional view of Fig. 3 taken on the line 5—5 thereof.

This valve device is intended to be installed, preferably set into the wall or fixture, in association with a shower bath or other apparatus using hot and cold water mixed to obtain a desired temperature. For the purpose of illustration, it is shown in a typical arrangement adapted for shower bath use.

The view seen in Fig. 1 is that which the user has of the device when using it in a shower bath. The handle 6 is pulled toward the user for the purpose of opening both the hot and the cold water valves, and the same handle is moved to right or left to modify the thermostatic adjustment of water temperature. Graduations on the dial or face plate 8 can, if desired, indicate degrees of temperature, but are shown merely indicating the hot and cold extremes of adjustment with arbitrary dividing marks between.

The valve mechanism is housed in a casing 10, fitted with a water-tight cover 12, the casing being designed to fit into an opening in the wall and to be connected with hot and cold water mains, of which one extends vertically within the wall on each side of the casing. At least one of these connections to the casing is preferably at such a level that, when the water system is drained, there will not be enough water trapped within the casing to cause damage in the event of freezing.

As will be seen from the following description of the valve mechanism, the user need only pull the handle toward himself to start the flow of water and this flow will from the very start be a mixture of hot and cold water, thus avoiding the wastage of water which ordinarily occurs during manual adjustment to obtain the desired temperature.

Referring to Fig. 5, it will be seen that the handle 6 is pivoted to the shaft 14 at 16 and is formed with a cam surface 18, which contacts the cover plate 12. The cam is held against the cover plate by the spring 20, inside of the casing, which is compressed by an outward movement of the shaft, thus, as the handle 6 is lifted, bringing the cam into contact with the plate at a lesser radius on the cam, the shaft 14 is urged inwardly by the spring 20 and the cam surface is held securely against the cover plate, thus retaining the handle 6 at whatever angle the user sets it.

Mounted upon the shaft 14 is an arm 22 carrying the roller 24. Thus, as the shaft moves inwardly, the roller is brought into engagement with the tiltable plate 26, which is thus moved in a direction to open one or both of the valves 28 and 30, against the stems of which the plate rests. The relative forces tending to open these two valves will depend upon the angle of the arm 22 and the resulting point of contact between the roller 24 and the plate 26. In the event that the arm has been moved in the direction of the valve 28, which admits hot water, the tendency will be to produce a greater opening of the valve 28 than of the valve 30. It will be seen that the plate 26 contacts a fixed fulcrum point 32, mounted on the post 34, attached to the housing 10. The plate 26, therefore, tilts about an axis established between the fixed point 32 and the movable roller 24. Movement of the arm 22 shifts roller 24 and modifies the leverage between the spring 36, which closes the hot water valve 28, and the spring 38, which closes the cold water valve 30.

The manual adjustment of the valves is modified by expansion of the bellows 40 in response to an increase of temperature within the chamber 44. The word "bellows" is herein used to define an expansible chamber such as the one formed between the cover plate 12 and the bellows or diaphragm 40. It is understood that the word "bellows" refers to any chamber having a variable internal volume and that no distinction is drawn between a bellows which is self-contained and a bellows or diaphragm which is sealed to the housing or some other part, as here shown. Thus, an expansion of the bellows 40 moves the roller 54 toward the plate or increases its pressure on the plate, as the case may be. In the event that the valve mechanism has not been used for some time, the water contained within it will be at substantially room temperature, under which condition the bellows 40 will have contracted due to a lowering of vapor pressure of the fluid 42 contained therein, partly in liquid and partly in vapor form. This fluid is selected from a group having relatively low vapor pressures within the temperature range for which the apparatus is designated. For instance, methylene chloride, $CH_2Cl_2$ (sometimes called Carrene), has a vapor pressure of one atmosphere absolute at about 104° F. and has a vapor pressure of approximately half an atmosphere at 70° F. While the temperature change from 70° to 104° provides a pressure change of only about 7 lbs. per square inch and the desired limits of regulation are much narrower than this, it is possible to obtain enough pressure change to actuate the mechanism by employing a bellows or diaphragm of sufficient diameter. Much greater pressure changes could be obtained by the use of a volatile fluid having a higher vapor pressure, that is a lower boiling point, but there is a serious objection to the use of such high vapor pressures in the thermostatic member of a valve of this type. One of the important features of this invention is the use of a volatile fluid having a relatively low vapor pressure so that, even at the highest temperature at which the device is intended to operate, the pressure of the fluid within the bellows will be less than the pressure of the water within the chamber 44. This insures that in the event of bellows leakage, due to accident or corrosion, the bellows will be expanded by the entry of water rather than caused to collapse due to the escape of gas. Normally the pressure within the bellows is sub-atmospheric and the pressure of the water in the chamber 44 is necessarily above atmosphere in order to deliver water at suitable pressure to the shower head 46.

It is permissible to use a volatile fluid 42 which exceeds atmospheric pressure slightly near the upper limits of the operating temperature range if provision is made for maintaining the pressure within the chamber 44 enough higher than the maximum pressure within the bellows so that the bellows will always leak inwardly rather than outwardly. This can be assured by the use of a weighted check valve 48, as seen in Fig. 2. Inside of the bellows 40 is a spring 50 tending to expand the bellows. This spring is of such strength as to insure proper expansion of the bellows and movement of the rocker arm 52 in spite of the fact that the water pressure is higher than the vapor pressure within the bellows.

Starting with cold water in the chamber 44, the bellows 40 will be in its collapsed condition and the roller 54 lifted away from the plate 26. This reduces to less than normal the force tending to open the cold water valve 30. Therefore, when the user lifts the handle 6 and the roller 24 presses against the plate 26, the first movement of this plate will open the hot water valve 28 more than, or even instead of the cold water valve 30. As water enters the chamber 44 from the hot supply line, the bellows 40 will expand, causing the roller 54 to tilt the plate 26 in the direction of opening the cold water valve 30 and closing the hot water valve 28. As soon as sufficient hot water has entered the chamber to produce actuation of the bellows 40, the control becomes automatic as to relative openings of the valves 28 and 30, maintaining a constant outlet temperature dependent upon the location of the roller 24. The user may move the handle 6 to right or left to shift the arm 22 and thereby change the position of the tilting axis of the plate 26.

In the sectional view, Fig. 4, two extreme positions, 24' and 24", have been indicated for the roller 24. In the first of these extreme adjustments, the plate 26 tilts about the axis 56—56, whereas in the other extreme position, plate 26 tilts about the axis 58—58. The first produces a greater opening of the hot water valve 28 and the second causes a greater opening of the cold water valve 30.

The extension 60 of the arm 22 engages the rocker 52 when the water is shut off by pushing the lever 6 against the face plate 8. This is a provision against the opening of the cold water valve 30 in response to an excessively high room temperature. In the event of excessively high temperature in the hot water line, or of steam entering the chamber 44 through the hot water inlet, the rise to higher than normal temperature causes an abnormal expansion of the bellows 40 opening the cold water valve to its full extent. This causes plate 26 to strike the safety fulcrum 62, allowing the hot water valve to close entirely.

The cover plate 12 is removable from the housing 10, carrying with it the bellows and the operating mechanism, except for the plate 26, which is loosely mounted and is separately removable. This allows access to the valves from the front without disturbing the connections between the housing and the water supply pipes. Unless the valves themselves are to be removed, it is not even necessary to shut off the water supply, thus the bellows and associated parts can be replaced as a unit in the event of bellows leakage. Either of the valve cages 64 or 66 may also be removed from the front without disturbing the water lines, except for shutting off the water supply by means of the service valves usually provided for this purpose. These valve cages are identical, as are the valves, and each internally fluted to allow for flow along the stem and provided with a gasket 68 to insure water tightness. These valves are preferably closed in the direction of flow or otherwise arranged so that a rise of pressure on the inlet side of a valve tends to close it, particularly in the case of the hot water valve.

The plate 26 is retained by the lugs 70 between which its tongue 72 fits loosely. The plate 26 is also notched at 74 to straddle the post 34. It is, therefore, seen that the plate 26 is retained in position but is free to tilt in any direction. Normally it is contacted on the upper side by the point 32 and the roller 24, and on the lower side by only the two stems of valve 28 and 30. In the event of an extreme opening of the valve 30 in response to an excess expansion of the bellows 40, the plate makes contact with the safety fulcrum 62, but normally this fulcrum is not contacted by the plate. The lugs 70 are of such height that the tongue 72 cannot be lifted over them at any position of the roller 24.

The shaft 14 has a bearing in the cover 12 and in the casing 10. To provide against leakage about the shaft 14 where it passes through the cover 12, a sealing washer 76 of rubber or other flexible material is clamped against a finished inner face on the cover 12 around the shaft 14 by a cup-shaped retainer 78 which surrounds the shaft 14 and is pressed against the seal by the spring 20. The seal 76 is formed with a smaller inside diameter than the outside diameter of the shaft 14 and is sufficiently flexible to bear against the shaft and thereby form a water-tight seal. Water pressure within the chamber 44 acts to increase the pressure of the seal against the shaft, thereby effecting a tight joint while allowing the shaft to rotate and to move longitudinally.

The bellows 40 is charged with a quantity of volatile fluid 42 through an opening which is then closed by the plug 80, which is preferably soldered to the cover 12. The quantity of volatile fluid is preferably sufficient so that a portion of it will always be in its liquid phase, while the major portion of the space within the bellows 40 is filled with the vapor of this fluid. While the vapor pressure condition is not changed by the quantity of liquid so long as some of the fluid remains in its liquid phase, it is advantageous to use only enough fluid to insure that a portion of it will remain in its liquid phase at the highest temperature to which the bellows is normally subjected. This insures quicker response to a rise of temperature than would be the case if a considerable quantity of liquid had to be heated by the rising water temperature. At the same time, it provides for all of the fluid going into its vapor phase in the event of an excessive temperature, thereby preventing the vapor pressure from rising to a point which might burst the bellows.

The bellows is shown as a combined bellows and diaphragm having a corrugated flexible head formed of the same material as the corrugated side walls. The post 82 is integral with a disc which is soldered to the bellows head and also forms a seat for the spring 50. The bellows is also soldered to the cover plate 12. The disc might, if desired, be enlarged to form a rigid head for the bellows. The post or lug 82 is pivoted to the rocker arm 52, which is in turn pivoted to the support 84, here shown as formed by two extensions from the cover 12. The cover plate is preferably secured to the body 10 by means of a number of screws and made fluid-tight therewith by means of the gasket 86. These screws are preferably hidden by face plate 8 on which are embossed the words "hot" and "cold." These markings, and the word "pull" on the handle 6, advise the user as to the directions in which the handle is to be moved for turning on and adjusting the valve mechanism.

The cam 18 may have a smooth surface contacting the cover 12 or it may be notched, as shown in Fig. 5. In the latter case, it may be desired to provide radial humps 90 so that the lever 6 has definite positions of valve opening and of temperature setting.

The valve 48 is shown in Fig. 5 as being provided with a small notch 88 across its seat to form a slow leak, yet not enough to affect its control of pressure in the chamber 44 when water is flowing from the shower head 46. This slow leak allows water to drain from the vertical pipe leading to the shower head when the chamber 44 is drained to avoid freezing.

What is claimed is:

1. In a fluid-mixing valve mechanism, a pair of inlet valves, a single manually operable handle having movements in two paths, means operable thereby to move said valves to control the combined volume of flow therethrough by movement in one of said paths and to move said valves to control the relative volumes of flow through said valves by movement in the other of said paths, and thermally actuated means operating through the first said means for modifying the relative openings of said valves, the last said means including an expansible chamber enclosing volatile fluid and spring means arranged to urge said wall of said chamber in the direction of expanding said chamber.

2. In a valve mechanism, a member, a fixed fulcrum point for said member, a movable fulcrum point for said member cooperating with said fixed fulcrum point to establish a fulcrum line about which said member may be tilted and which may be shifted laterally with respect to said member, the path of movement of said movable fulcrum being at all times removed from said fixed fulcrum engagement with said member, a pair of valves operatively associated with said member for receiving actuating movement therefrom, means constantly urging each said valve toward one direction of movement, and means for adjusting said movable fulcrum point in two directions one effective through said member to vary the degrees of opening of said valves in the same direction and the other effective through said member to vary the relative degrees of opening of said valves.

3. In a valve mechanism having two inlet ports, a valve for each of said ports, a tiltable member arranged to actuate said valves, a pair of fulcrum members against which said tiltable member is urged to establish a fulcrum line, and means for moving one of said fulcrum members in a path at all times removed from the point of engagement of the other of said fulcrum members with said tiltable member, said path approximately following the surface it contacts on said tiltable member thereby to vary the position of said fulcrum line between opposite sides of said member and effect a corresponding variation of the effective leverage arms of said member on said valves to vary the opening of one valve relative to the other and for moving one of said fulcrum members in a different path such as to cause said tiltable member to actuate both of said valves in the same direction as to their degrees of opening.

4. In a temperature-regulating valve mechanism, a mixing chamber, an expansible chamber exposed to temperature and pressure effects of a fluid in said mixing chamber, spring means tending to expand said expansible chamber, a charge of volatile fluid within said expansible chamber having a vapor pressure lower than the maximum prevailing pressure within said mixing chamber throughout the normal temperature and pressure conditions of use of said valve mechanism, a pair of ports leading into said mixing chamber, one from hot and one from a cold supply conduit, a valve for each of said ports, means operatively connecting a wall of said expansible chamber with at least one of said valves for the purpose of varying the temperature of mixed fluid within said chamber, and a single manually operable means operable to vary the opening of both of said valves in a direction to increase the flow past both thereof in response to movement in one path to decrease the flow past both thereof in response to movement in the opposite direction in said path, and to vary the flow past one of said valves with respect to the flow past the other thereof by movement in a second path.

5. In a temperature-regulating valve mechanism, a mixing chamber, an expansible chamber exposed to temperature and pressure effects of a fluid in said mixing chamber, spring means tending to expand said expansible chamber, a charge of volatile fluid within said expansible chamber having a vapor pressure lower than the maximum prevailing pressure within said mixing chamber throughout the normal temperature and pressure conditions of use of said valve mechanism, a pair of ports leading into said mixing chamber, one from a hot and one from a cold supply conduit, a valve for each of said ports, means operatively connecting a wall of said expansible chamber with both of said valves for the purpose of varying the temperature of mixed fluid within said chamber, manually operable means outside of said chamber, and means having two movement, one of said movements being transverse to the other, inside of said chamber operable by said outside means, one of said movements being effective to modify the openings of said valves in the same direction to modify their combined rate of flow and the other of said movements being operable to vary the ratio between movements of said wall of the expansible chamber and movements of said valves.

6. In a mixing valve mechanism, a chamber, a pair of inlet valves controlling the flow of fluid from different sources to said chamber, a tiltable member adapted to open said valves, one by said member tilting in one direction and the other by said member tilting in the opposite direction, a pair of contact points serving to define an axis upon which said member tilts at least one of said contact points being shiftable in a direction to inversely vary the leverage arm of said member about said axis on said valves, and thermally actuated means tending to bias said member in a direction to urge one of said valves in a direction to modify its opening, and means for moving said one of said points to shift said axis.

7. In a valve mechanism for mixing hot and cold water, a mixing chamber, an expansible chamber in heat exchange relation with said mixing chamber, a charge of volatile fluid in said expansible chamber having a subatmospheric vapor pressure at ordinary room temperatures, means in addition to fluid discharge head for maintaining a predetermined minimum pressure in said mixing chamber, a valve for admitting hot water to said mixing chamber, a valve for admitting cold water to said mixing chamber, and a single manually operable means for opening both said valves simultaneously and operable to effect closing of both said valves and for independently varying the relative opening of said valves, said valve mechanism being actuated in a direction to close said hot water valve by expansion of said expansible chamber.

8. In a hot and cold fluid mixing valve mechanism, means forming a mixing chamber, a pair of valves, thermally responsive means comprising an expansible chamber charged with a volatile fluid for regulating said valves to control the relative rates of flow of hot and cold fluid into said chamber, and a valve located in the outlet of said mixing chamber, said valve being loaded to move in its closing direction and thereby maintain in said chamber a pressure higher than the normal maximum operating vapor pressure within said expansible chamber.

9. In a fluid-mixing valve mechanism, a mixing chamber, a pair of inlet ports for said chamber, one for a hot fluid and one for a cold liquid, a valve for each of said ports, a single outlet port for said chamber, manually operable means for simultaneously opening and for simultaneously closing both said inlet valves, said means including a member inside of said chamber acting on both said valves, thermally responsive means for biasing said member in one direction, said thermally responsive means comprising an expansible chamber enclosing a thermally affected material and normally having in the last said chamber a lower fluid pressure than that of the mixed fluid in said mixing chamber, and manually operable means for varying the ratio between movements of said thermally responsive means and movements of one of said valves.

10. In a temperature regulating valve mechanism, an inlet valve for hot fluid, an inlet valve for cold fluid, a tiltable member operatively connected at spaced points to said valves, a member forming at least a portion of a fulcrum for said tiltable member and serving upon movement thereof to shift the axis about which said member tilts, said fulcrum member being movable in two different directions transverse to each other, movement of said fulcrum member in one of said directions acting to increase the distance between one of said points and said axis and to decrease the distance between the other of said points and said axis and movement of said fulcrum member in the other of said directions acting to simultaneously cause each of said valves to move in its closing direction or each of said valves in its opening direction, and manually operable means for shifting said fulcrum member in both said directions.

11. In a temperature regulating valve mechanism, an inlet valve for hot fluid, an inlet valve for cold fluid, a tiltable member operatively connected at spaced points to said valves, a member forming at least a portion of a fulcrum for said tiltable member and serving upon movement thereof to shift the axis about which said member tilts, said fulcrum member being movable in two different directions transverse to each other, movement of said fulcrum member in one of said directions acting to increase the distance between one of said points and said axis and to decrease the distance between the other of said points and said axis and movement of said fulcrum member in the other of said directions acting to simultaneously cause each of said valves to move in its closing direction or each of said valves in its opening direction, manually operable means for shifting said fulcrum member in both said directions, and thermostatic means cooperable with said tiltable member acting under rise in temperature thereof to tilt said member in a direction tending to open said cold fluid valve and close said hot fluid valve.

12. In a valve mechanism, in combination, a pair of spaced valves arranged to be opened by movement in the same direction, spring means constantly urging said valves toward closed position, a fixed fulcrum, a member interconnecting said valves and said fixed fulcrum, a movable fulcrum operatively associated with said fixed fulcrum to provide a shiftable tilting axis for said member, said movable fulcrum being movable in one direction to inversely vary the leverage arms of said member about said tilting axis on said valves, and in another direction to either simultaneously increase or simultaneously decrease the pressure of said member on both said valves, and manually operable means for shifting said movable fulcrum in both said directions.

13. In a valve mechanism, in combination, a pair of spaced valves arranged to be opened by movement in the same direction, spring means constantly urging said valves toward closed position, a fixed fulcrum, a member interconnecting said valves and said fixed fulcrum, a movable fulcrum operatively associated with said fixed fulcrum to provide a shiftable tilting axis for said member, said movable fulcrum being movable in one direction to inversely vary the leverage arms of said member about said tilting axis on said valves, and in another direction to either simultaneously increase or simultaneously decrease the pressure of said member on both said valves, manually operable means for shifting said movable fulcrum in both said directions, and thermally responsive means cooperating with said member and operable to bias said member in one direction about its tilting axis.

GLENN MUFFLY.

REFERENCES CITED

The following references are of record in the file of this patent:

UNITED STATES PATENTS

| Number | Name | Date |
| --- | --- | --- |
| Re. 21,873 | Hermann | Aug. 12, 1941 |
| 1,128,425 | Dunham | Feb. 16, 1915 |
| 1,220,985 | Harter | Mar. 27, 1917 |
| 1,311,809 | Giesler | July 29, 1919 |
| 1,397,707 | Snediker | Nov. 22, 1921 |
| 1,476,718 | Leonard | Dec. 11, 1923 |
| 1,869,663 | Cartier | Aug. 2, 1932 |
| 2,171,992 | Rantine | Sept. 5, 1939 |
| 1,511,974 | Lindeman | Oct. 14, 1924 |
| 1,083,015 | Holzhausen | Dec. 30, 1913 |
| 2,322,157 | Porter | June 15, 1943 |
| 1,939,970 | Fuess | Dec. 19, 1933 |
| 2,065,481 | Thulman | Dec. 22, 1936 |

FOREIGN PATENTS

| Number | Country | Date |
| --- | --- | --- |
| 522,577 | Great Britain | June 21, 1940 |